US012110192B2

(12) United States Patent
Graffin

(10) Patent No.: US 12,110,192 B2
(45) Date of Patent: Oct. 8, 2024

(54) ARTICLE TRANSFER DEVICE HAVING VARIOUS TRANSVERSE DIMENSIONS AND SYSTEM COMPRISING SUCH DEVICES

(71) Applicant: Serac group, La Ferte Bernard (FR)

(72) Inventor: André Jean-Jacques Graffin, Chicago, IL (US)

( * ) Notice: Subject to any disclaimer, the term of this patent is extended or adjusted under 35 U.S.C. 154(b) by 78 days.

(21) Appl. No.: 17/913,998

(22) PCT Filed: Mar. 24, 2021

(86) PCT No.: PCT/EP2021/057596
§ 371 (c)(1),
(2) Date: Sep. 23, 2022

(87) PCT Pub. No.: WO2021/191293
PCT Pub. Date: Sep. 30, 2021

(65) Prior Publication Data
US 2023/0127354 A1    Apr. 27, 2023

(30) Foreign Application Priority Data
Mar. 24, 2020   (FR) ...................................... 2002871

(51) Int. Cl.
*B65G 47/86* (2006.01)
*B67C 3/24* (2006.01)
*B67C 7/00* (2006.01)

(52) U.S. Cl.
CPC .............. *B65G 47/847* (2013.01); *B67C 3/24* (2013.01); *B67C 7/0053* (2013.01); *B67C 7/00* (2013.01)

(58) Field of Classification Search
CPC .. B65G 47/847; B65G 47/842; B67C 7/0053; B67C 3/24; B67C 7/00
(Continued)

(56) References Cited

U.S. PATENT DOCUMENTS 6,302,172 B1* 10/2001 De Villele ........... C10M 143/00
198/470.1
8,307,977 B2* 11/2012 Nguyen ................. B65G 47/71
198/470.1

(Continued)

FOREIGN PATENT DOCUMENTS

DE        10325137 A1 * 1/2005 ........... B65G 47/847
DE    102006012020 A1 * 9/2007 ......... B29C 49/4205

*Primary Examiner* — James R Bidwell
(74) *Attorney, Agent, or Firm* — Muncy, Geissler, Olds & Lowe, P.C.

(57) ABSTRACT

An article transfer device includes a rotating structure bearing cantilevered gripping tongs, each including two jaws each on one side of a longitudinal axis of the tongs and movable relative to each other to maintain a central axis of the cylindrical portion of the articles intersecting with the longitudinal axis of the tongs regardless of the transverse dimension. The jaws have ends in the same plane, provided with bearing surfaces facing one another to form together a centring V of the cylindrical portion and a length such that they extend back from a transverse axis of the cylindrical portion perpendicular to the longitudinal axis of the tongs and to a central axis of the cylindrical portion. The end of one of the jaws is extended by a first finger extending offset from the plane and is supported on the cylindrical portion beyond the transverse axis. A system includes such devices.

10 Claims, 15 Drawing Sheets

(58) Field of Classification Search
USPC .................................................. 198/470.1
See application file for complete search history.

(56) References Cited

U.S. PATENT DOCUMENTS

| | | | | |
|---|---|---|---|---|
| 9,353,905 B2 * | 5/2016 | Gruson | ................ | B65G 47/908 |
| 2010/0200367 A1 * | 8/2010 | Nguyen | ............... | B65G 47/847 |
| | | | | 198/470.1 |

* cited by examiner

ARTICLE TRANSFER DEVICE HAVING VARIOUS TRANSVERSE DIMENSIONS AND SYSTEM COMPRISING SUCH DEVICES

The present invention relates to a device for transferring articles, each having a respective cylindrical portion, which portions may present a variety of sizes.

BACKGROUND OF THE INVENTION

Container-transfer devices are known that include a rotary structure carrying gripper clamps that are cantilevered out to support the containers by the neck, each gripper clamp comprising two facing jaws, each of which is mounted to pivot about a pivot axis carried by the rotary structure. The jaws are generally associated with a drive member arranged to move the jaws in symmetrical manner relative to a plane extending radially relative to the rotary structure and containing the vertical axis of the neck of a container being carried by said clamp.

Transfer from an upstream rotary structure to downstream rotary structure generally takes place by providing rotary structures at different heights in such a manner that the gripper clamps of the upstream rotary structure grip the containers at a height that is different from the gripper clamps of the downstream rotary structure: this avoids any interference between the gripper clamps of the upstream rotary structure and the gripper clamps of the downstream rotary structure while transferring containers from one structure to the other. A change of containers can require the heights of the rotary structures to be modified.

Furthermore, in order to hold the containers while the supporting structure is rotating, it is necessary for the gripper jaws to be adapted to match the size of the necks of the containers.

When a given container-transfer device is to be used for transferring containers having necks of different sizes, it is therefore generally necessary to change the gripper clamps, which constitutes an operation that is time-consuming and tedious and that also requires the associated production line to be stopped.

In order to be able to adapt a gripper clamp to containers having a variety of dimensions without being obliged to change the jaws, proposals have been made, in particular in Document EP-A-0 366 225, to control jaw positioning by means of a frustoconical cam having a variety of outlines at different levels, each corresponding to a respective container size. In order to adapt the machine to a container size, it is necessary to change the level of the cam so that the cam followers of the clamps are facing the appropriate outline. The machine is therefore complicated in structure.

Proposals have also been made, in particular in Documents JP-A-7025454, DE-A-29712066, DE-A-10325137, and JP-A-2003095429, to mount hinged adaptation parts on the jaws. The space occupied laterally by each camp is greatly increased, such that that solution is not compatible with minimizing overall size in order to maximize the number of clamps on a machine.

OBJECT OF THE INVENTION

An object of the invention is to propose a simplified article-transfer device that is capable of transferring articles while remedying the above-mentioned drawbacks, at least in part.

BRIEF DESCRIPTION OF THE INVENTION

In order to achieve this object, the invention provides a device for transferring articles, each having a cylindrical portion of transverse size lying in a range from a minimum size to a maximum size. The transfer device comprises a transport structure carrying cantilevered-out gripper clamps, each comprising first and second jaws extending on respective sides of a longitudinal axis of the clamp, which jaws are movable relative to each other to keep a central axis of the cylindrical portion of an article intersecting said longitudinal axis of the clamp regardless of the transverse size. The jaws have ends extending in a common plane, the jaws being provided with facing bearing surfaces so that together they form a V-shape for centering the cylindrical portion and being of length such that they extend set back from a transverse axis of the cylindrical portion that is perpendicular both to the longitudinal axis of the clamp and to a central axis of the cylindrical portion. Said end of the first jaw is extended by a first finger that extends offset from the plane and that has a bend so as to form a V-shape with said end of the first jaw and bear against the cylindrical portion beyond the transverse axis.

The term "cylindrical portion" is used to mean a portion that is substantially cylindrical, i.e. purely cylindrical or slightly conical. An article can be transferred from one gripper clamp to another without any risk of the finger of one of the clamps interfering with the ends of the jaws of the other gripper clamp, even when the gripper clamps are at the same height.

Preferably, only one of the jaws is provided with a finger, namely the first jaw.

This optimizes centering of the cylindrical portions regardless of their size in the range between the minimum size and the maximum size.

Advantageously, the finger extends above said plane, and if the cylindrical portion includes a collar, the jaws are preferably arranged in such a manner that their ends are provided with bearing surfaces that bear against the cylindrical portion under the collar and the finger bears against the cylindrical portion above the collar.

This improves holding of the article by the clamp and facilitates transferring the article from a clamp of an upstream rotary structure to a clamp of a downstream rotary structure by avoiding any risk of the finger of the clamp taking charge of the article coming into abutment against the collar, since the finger of the clamp carrying the article tends to generate torque pressing the collar against the top surfaces of the ends of the jaws as a result of the finger bearing above the collar.

The invention also provides a container-processing installation including such transfer devices.

Other characteristics and advantages of the invention appear on reading the following description of a particular, nonlimiting embodiment of the invention in association with a device for transferring containers by the neck.

Reference is made to the accompanying figures, in which.

DETAILED DESCRIPTION OF THE INVENTION

Figure 1:
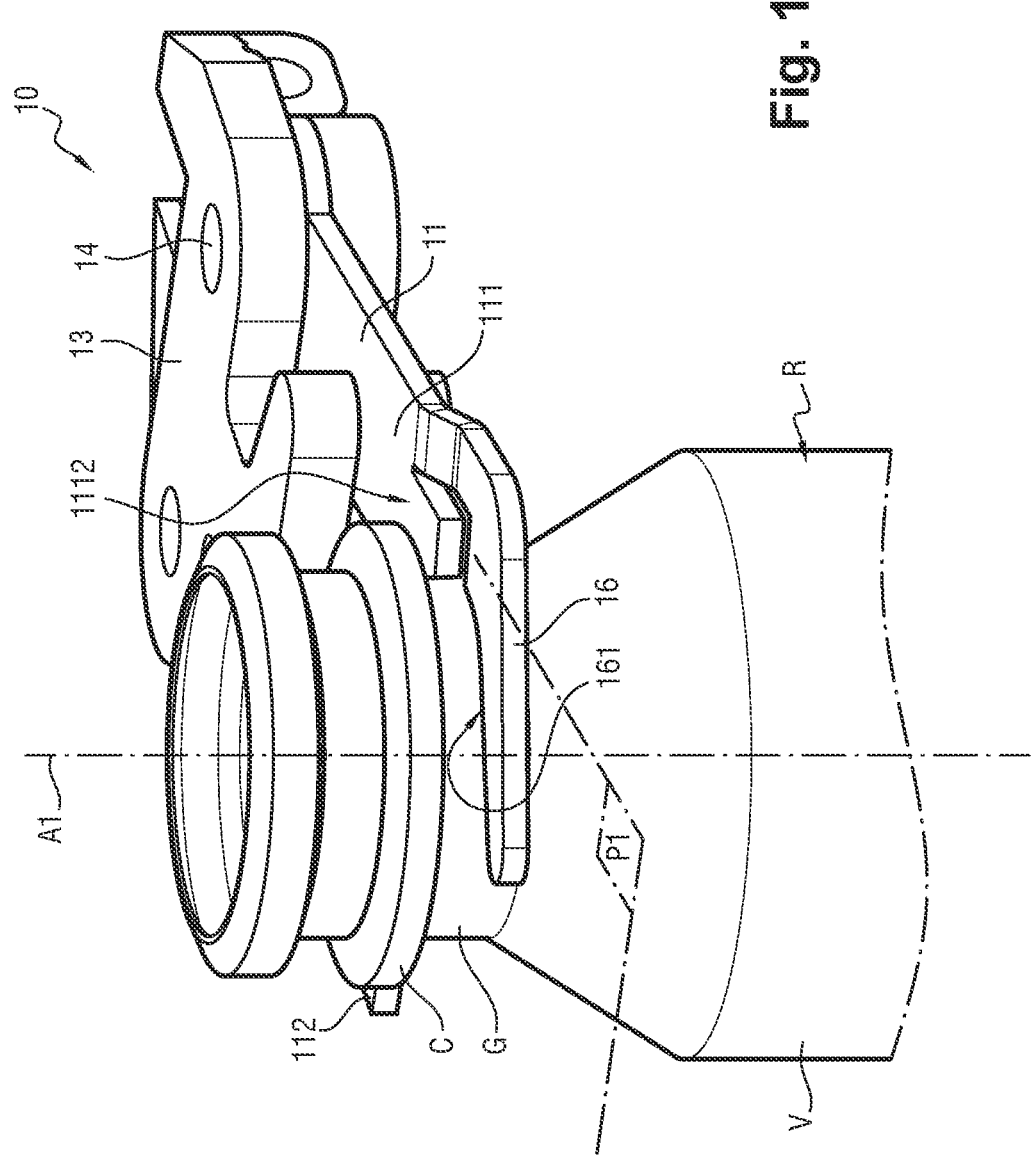
FIG. 1 is a perspective view of a clamp of the invention, while of gripping a container by the neck.

With reference to the figures, the invention is described below in application to handling containers R each having a body V surmounted by a generally cylindrical portion forming a neck or spout G of circular cross-section with a collar C projecting transversely therefrom. The container R has a central axis A1 that is to extend vertically, and it forms a body of revolution centered on said axis A1. The invention applies to articles other than containers, such as, for example, objects that are not hollow, or that are cylindrical in shape over their entire height, or that are of a rectangular block shape with a cylindrical portion extending therefrom, . . . .

With reference to FIGS. 1 to 10, the container-transfer installation comprises a stand (not shown in the figures) having two transfer devices mounted thereon, given overall numerical reference 1 and respective numerical references 1.A and 1.B. The transfer device 1.A is arranged upstream from the transfer device 1.B.

In conventional manner, each transfer device 1A and 1B comprises a rotary structure 2A, 2B in the form of a platform mounted to turn on the stand about a vertical axis and driven in rotation by a motor that is not shown.

Each rotary structure 2A, 2B caries gripper clamps given overall references 10.A, 10.B, with only one clamp being shown for each transfer device 1A, 1B.

Each gripper clamp 10.A, 10.B has first and second jaws 11 and 12, each extending on a respective side of a longitudinal axis A2 of the gripper clamp, said longitudinal axis A2 being in alignment with a radius of the rotary structure 2.A, 2.B. The jaws 11 and 12 of each clamp have respective first ends 111 and 121, and respective opposite second ends 112 and 122 between which there are respective intermediate portions that are hinged to a common plate 13 by respective pins 14 extending perpendicularly to the axis A2 and parallel to the axes of rotation of the rotary structures 2.A and 2.B. The plates 13 are fastened to the corresponding rotary structures 2.A and 2.B in such a manner that the first ends 111 and 121 are cantilevered out from the structures 2.A and 2.B.

The first ends 111 and 121 of the jaws 11 and 12 lie in a common plane P1 that is normal to the pins 14, and they are provided with facing vertical bearing surfaces 1111 and 1211 that are inclined relative to the longitudinal axis A2, so that together they form a V-shape for centering the neck G on the longitudinal axis A2. The jaws 11 and 12, and more particularly the first ends 111 and 121, are of length such that the first ends 111 and 121 are set back from a transverse axis A3 of the neck G that is perpendicular both to the longitudinal axis A2 of the clamp 10.A or 10.B and to the central axis A1 of the container R. In other words, the bearing surfaces 1111 and 1121 bear against a portion (a half) of the neck G that faces the plate 13 of the gripper clamp 10.A or 10.B under consideration, and that is referred to herein as the "front" portion. The first end of the first jaw 111 is extended by a first finger 16 that is offset from the plane P1 and that has a bend so as to present a vertical surface 161 that bears against the neck G beyond the transverse axis A3, i.e. on a rear portion of the neck G that is opposite from the front portion in contact with the bearing surfaces 1111 and 1121. The bearing surface 1111 and the bearing surface 161 together likewise define a V-shape in which the neck G is held by the bearing surface 1211. It should be observed that the bearing surface 161 bears against the neck G on the same side of the longitudinal axis A2 as the bearing surface 1111.

The first ends 111 and 121 of the jaws 11 and 12 are provided with respective top surfaces 1112 and 1212 that are horizontal (parallel to the plane P1) and on which the collars C of the containers R are to rest.

Between the second ends 112 and 122 there extends a compression spring 15 tending to move the second ends 112 and 122 apart and, given the intermediate positions of the pins 14, thus tending to move the first ends 111 and 121 towards each other.

It should be observed that the jaws 11 and 12 of the gripper clamps 10.A are in positions that are opposite relative to the positions of the jaws 11 and 12 of the gripper clamps 10.B.

The second end 112 of the first jaw 11 of each gripper clamp 10.A is extended by a lever 17 having a surface 171 that is arranged to co-operate like a cam with a wheel 3.A that is in a position that is fixed relative to the stand and that lies on the path of the surface 171 when the rotary structure 2.A is turning relative to the stand. The surface 171 is inclined relative to said path so as to act as a cam that causes the ends 111 and 121 to move apart when the surface 171 encounters the wheel 3.A.

The second end 122 of the second jaw 12 of each gripper clamp 10.B is extended by a lever 17 having a surface 171 that is arranged to co-operate like a cam with a wheel 3.B that is in a position that is fixed relative to the stand and that lies on the path of the surface 171 when the rotary structure 2.B is turning relative to the stand. The surface 171 is inclined relative to said path so as to act as a cam that causes the ends 111 and 121 to move apart when the surface 171 encounters the wheel 3.B.

The first jaw 11 has a drive lug 18 pivotally engaged in a notch 19 of the second jaw 12 so as to form a lever hinge for transmitting the drive that results from the wheel 3.A or 3.B bearing against the cam surface 171. The drive lug 18 and the notch 19 are designed to cause the jaws 11 and 12 to move in opposite directions relative to the longitudinal axis A2 and to the corresponding radius of the rotary structure 2.A or 2.B intersecting the central axis A1 of the container.

The gripper clamps of the invention are thus adapted to grip containers having respective necks of sizes lying in a range from a minimum size to a maximum size.

Figure 2:
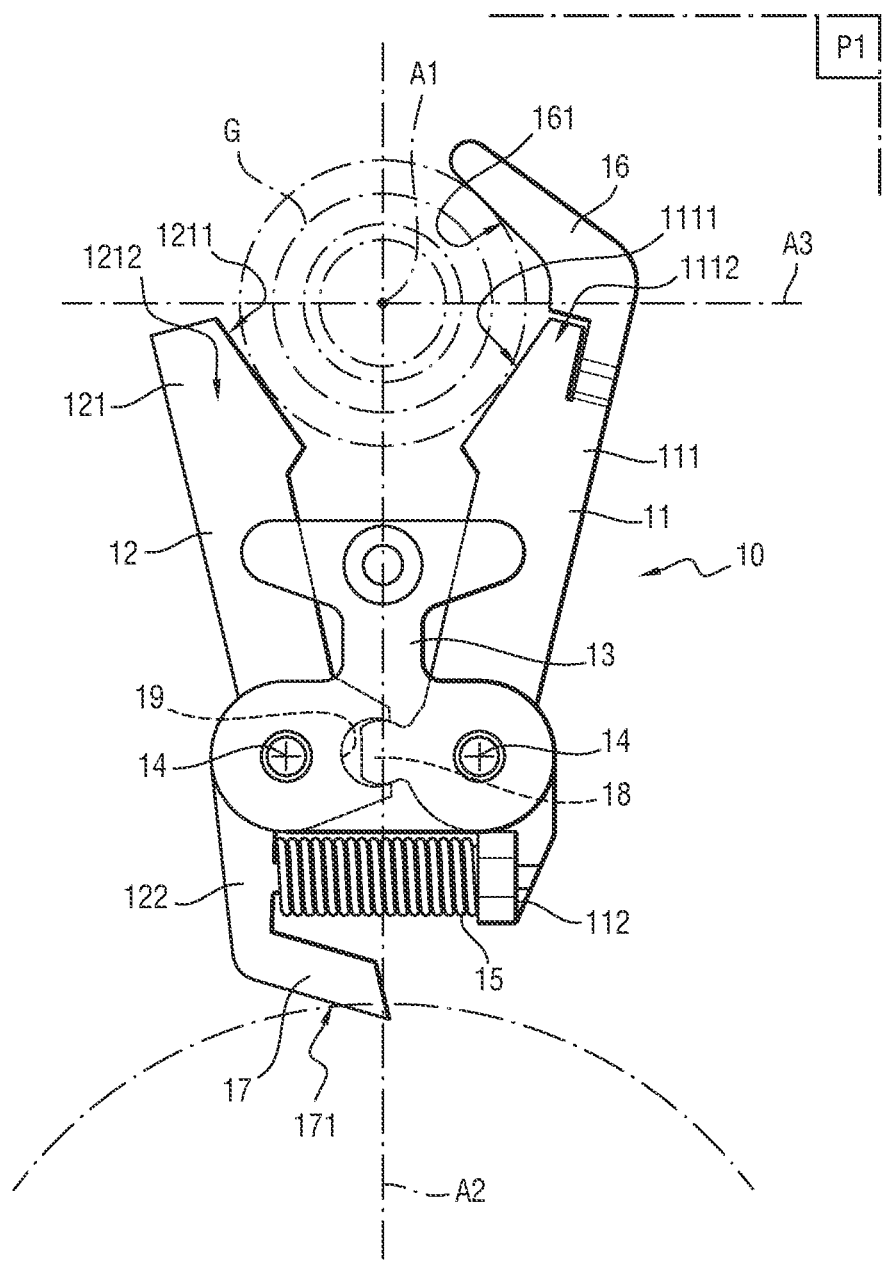
FIG. 2 is a plan view of the clamp in its position for gripping a container having a neck of maximum transverse size.

FIG. 2 shows the position of the gripper jaws in a device being used with containers having necks of the maximum transverse size. Under such circumstances, when in the closed position, a clamp has three points of contact with the neck G, two on its front portion and one on its rear portion.

Figure 3:
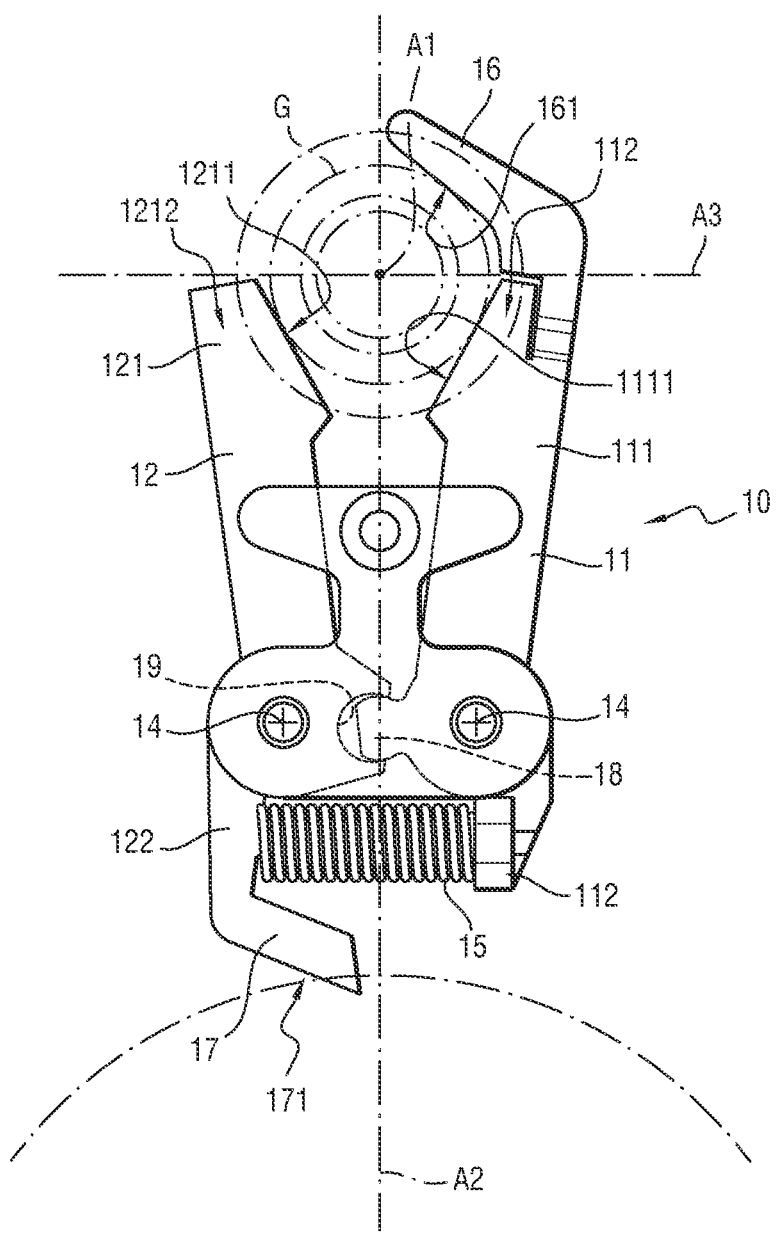
FIG. 3 is a view analogous to the view of FIG. 2 showing the same clamp in its position for gripping a container having a neck of intermediate transverse size.

FIG. 3 shows the position of the gripper jaws in a device being used with containers having necks of intermediate transverse size. Under such circumstances, when in the closed position, a clamp has three points of contact with the neck G, two on its front portion and one on its rear portion.

Figure 4:
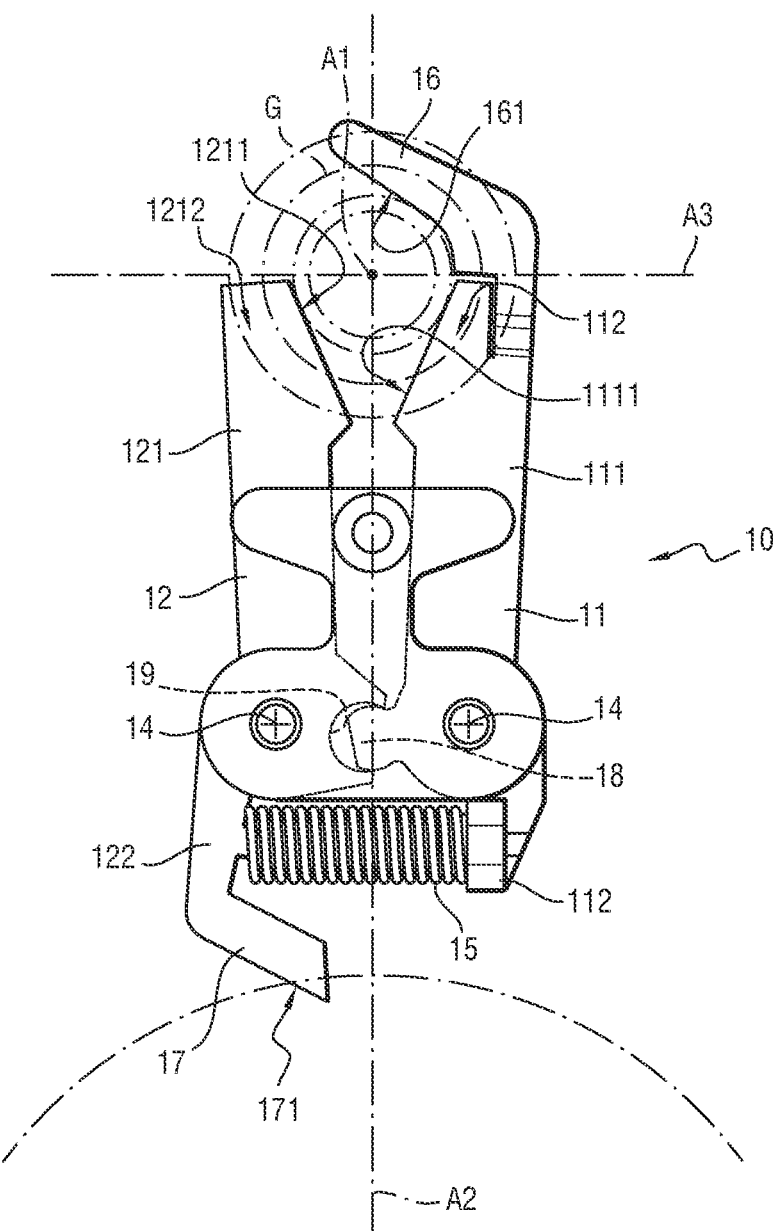
FIG. 4 is a view analogous to the view of FIG. 2 showing the same clamp in its position for gripping a container having a neck of minimum transverse size.
Figure 5:
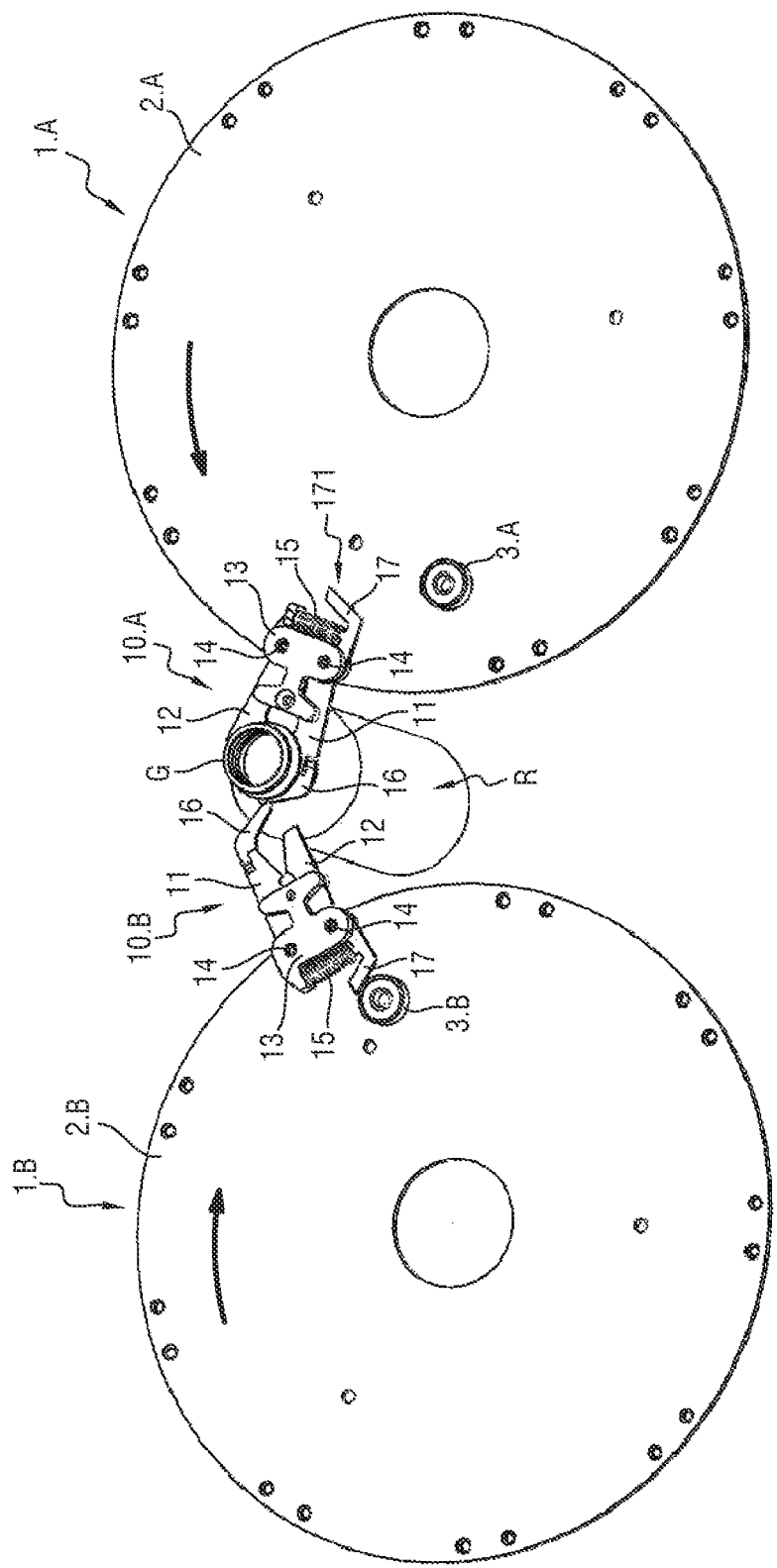
FIG. 5 is a diagrammatic perspective view, seen from above, of a processing installation of the invention, prior to transferring a container from a first rotary structure to a second rotary structure.

FIG. 4 shows the position of the gripper jaws in a device being used with containers having necks of the minimum transverse size. Under such circumstances, when in the closed position, a clamp has three points of contact with the neck G, two on its front portion and one on its rear portion.

It can be seen that the synchronized movement of the jaws between the open and closed positions enables the central axis A1 of the container R to be positioned on the longitudinal axis A2 regardless of the transverse size of the neck G in the minimum to maximum size range.

It can be seen that the bearing surface 1111 and the bearing surface 161 bear against the neck G symmetrically relative to the transverse axis A3, and the bearing surface 1111 and the bearing surface 1211 bear against the neck G symmetrically relative to the longitudinal axis A2.

In the embodiment described, the clamp is adapted to grip necks having transverse sizes lying in the range 25 millimeters (mm) to 45 mm. To this end, the gripper jaws are configured so that, both for a neck having a minimum transverse size and for a neck having a maximum transverse size, both jaws bear against the front portion of the neck G at respective bearing points, and the finger 16 of the first jaw bears against the rear portion of the neck G at a bearing point.

FIGS. 5 to 10 show a container R being transferred from the rotary structure 2.A to the rotary structure 2.B.

Initially, the container is held by one of the gripper clamps 10.A that turns with the rotary structure 2.A. The rotary structures turn in synchronous manner so that at their point of tangency said gripper clamp 10.A carrying the container R faces a gripper clamp 10.B that is empty.

Figure 6:
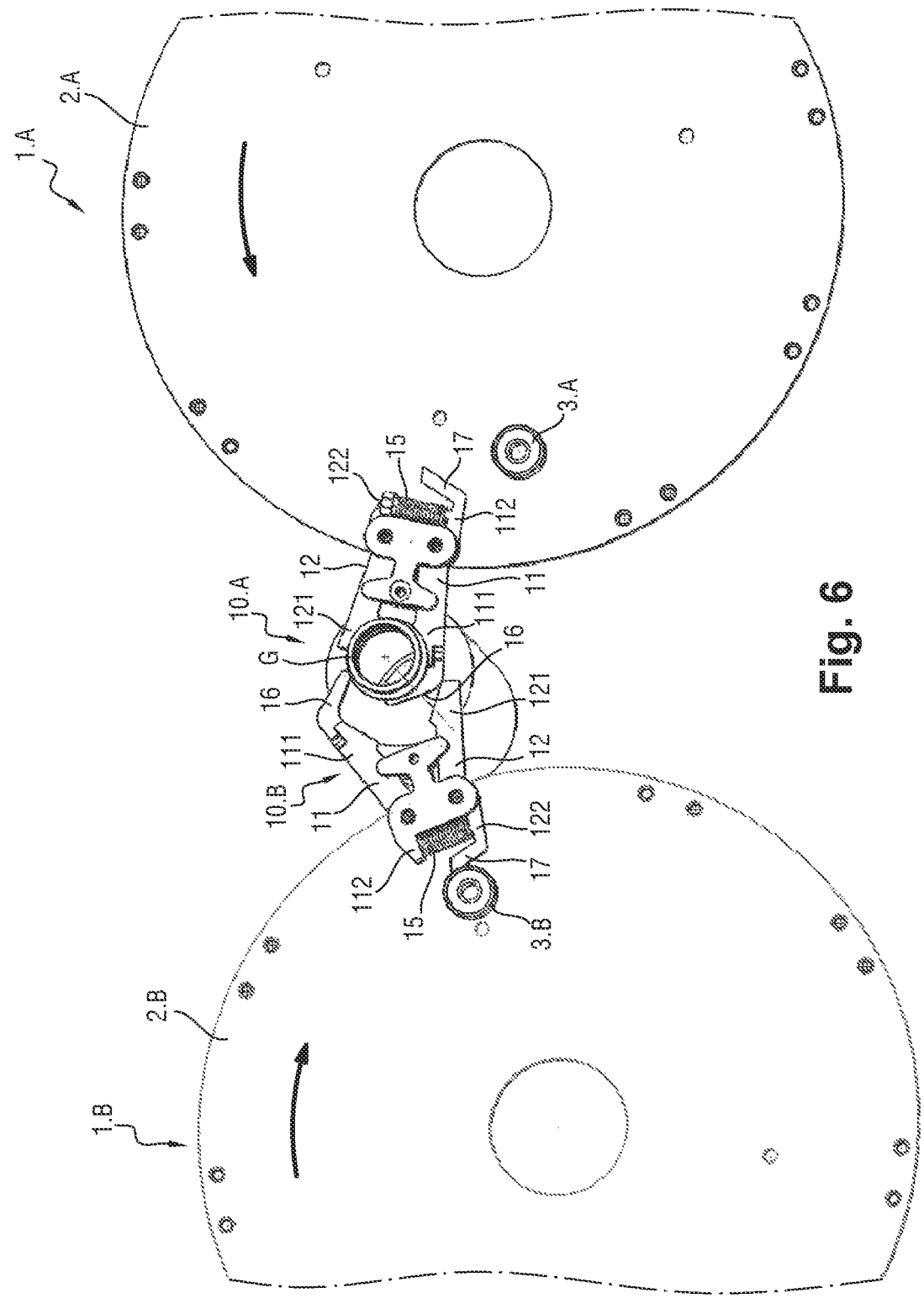
FIG. 6 is a view analogous to FIG. 5, at the beginning of the transfer.

In the vicinity of the point of tangency between the rotary structures 2.A and 2.B, the surface 171 of the clamp 10.B that is to take hold of the container R comes into contact with the wheel 3.B (FIG. 5), thereby causing the ends 111 and 121 of the jaws 11 and 12 of said gripper clamp 10.B to move apart (FIG. 6). Turning of the rotary structures 2.A and 2.B causes the neck G to be inserted between the spaced-apart ends 111 and 121 of the gripper clamp 10.B before the surface 171 leaves the wheel 3.B.

Figure 7:
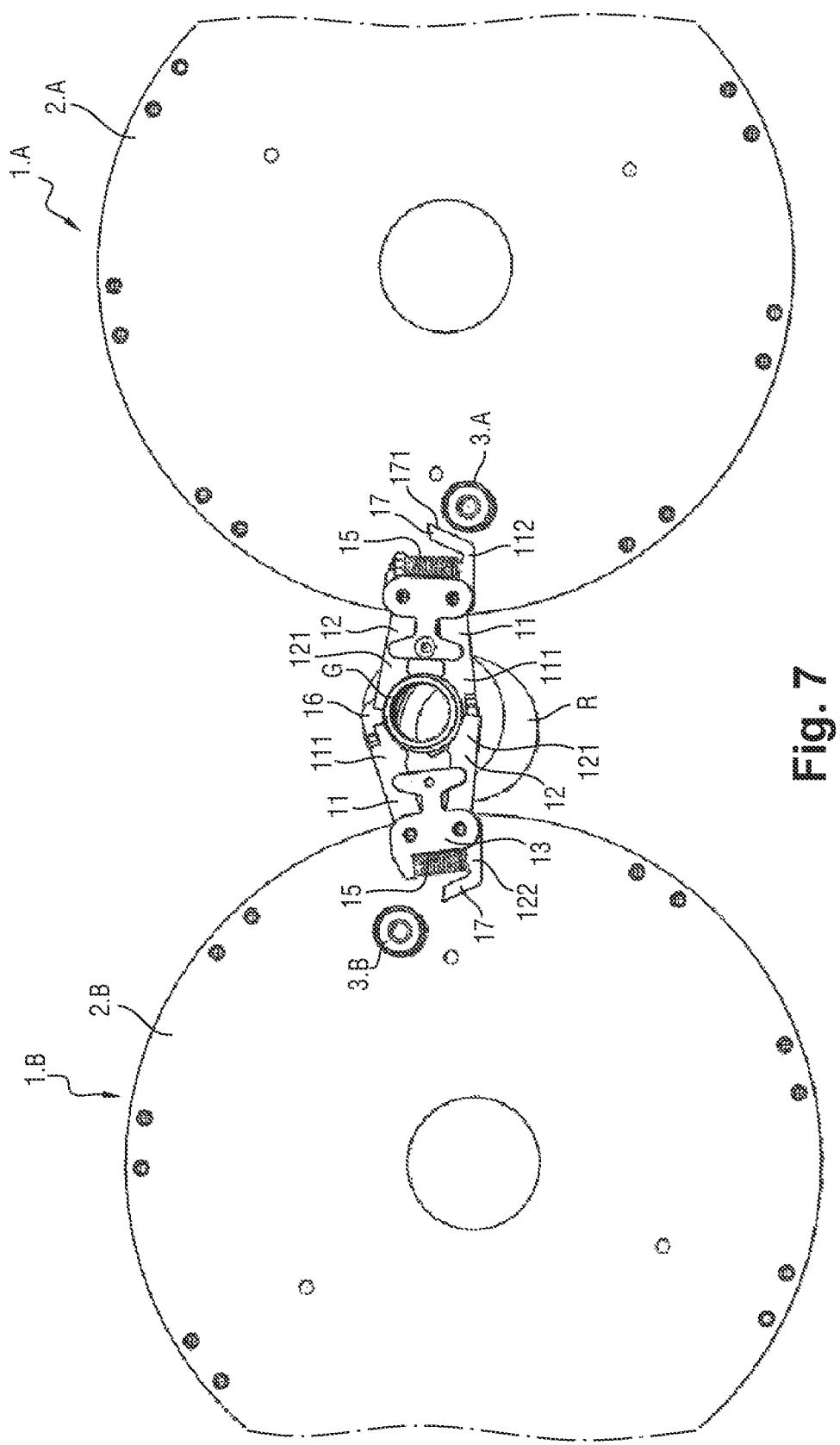
FIG. 7 is a view analogous to FIG. 5, during transfer, the container being supported simultaneously by one of the clamps of the first rotary structure and by one of the clamps of the second rotary structure.
Figure 8:
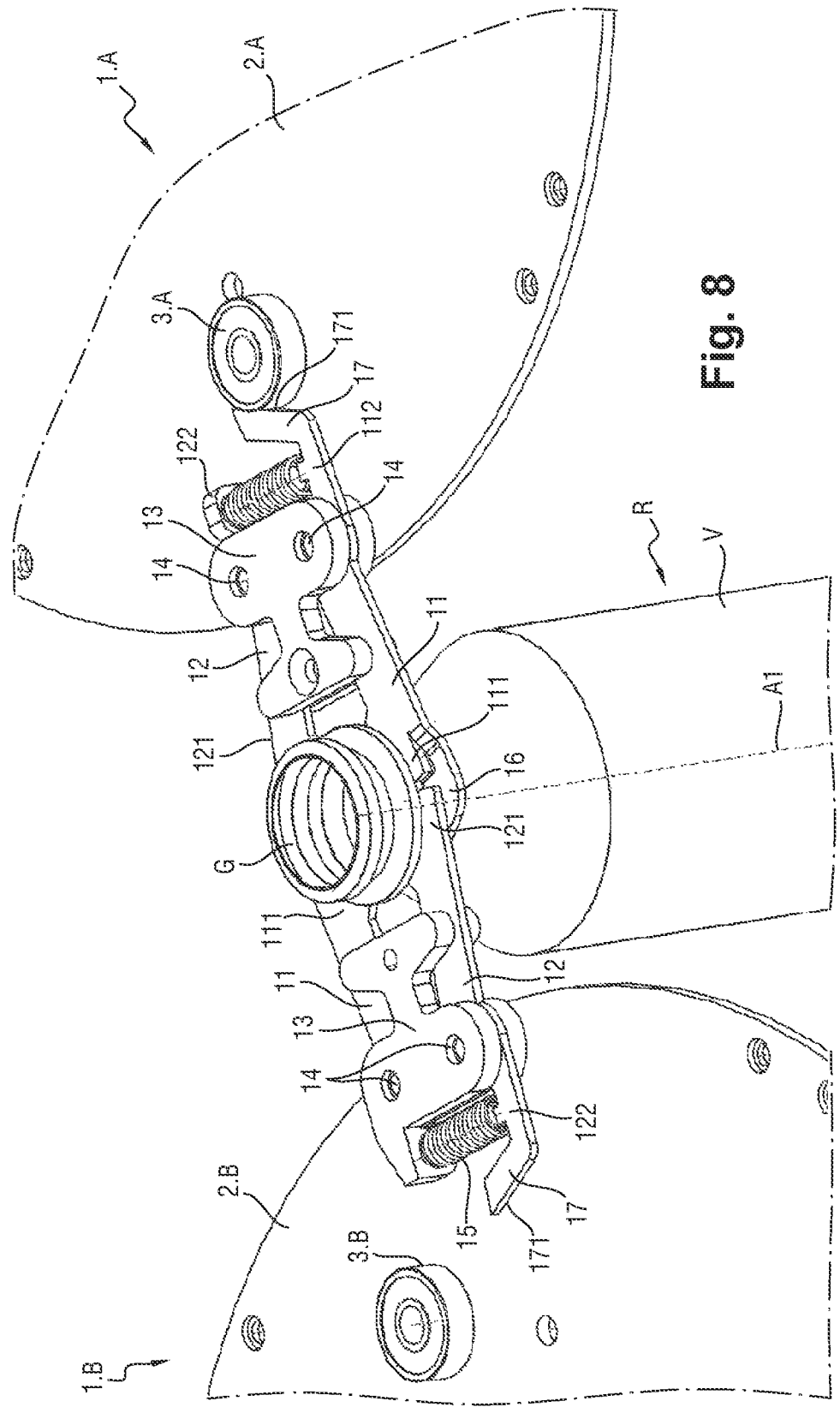
FIG. 8 is an enlarged perspective view of FIG. 7, seen from a different angle.
Figure 9:
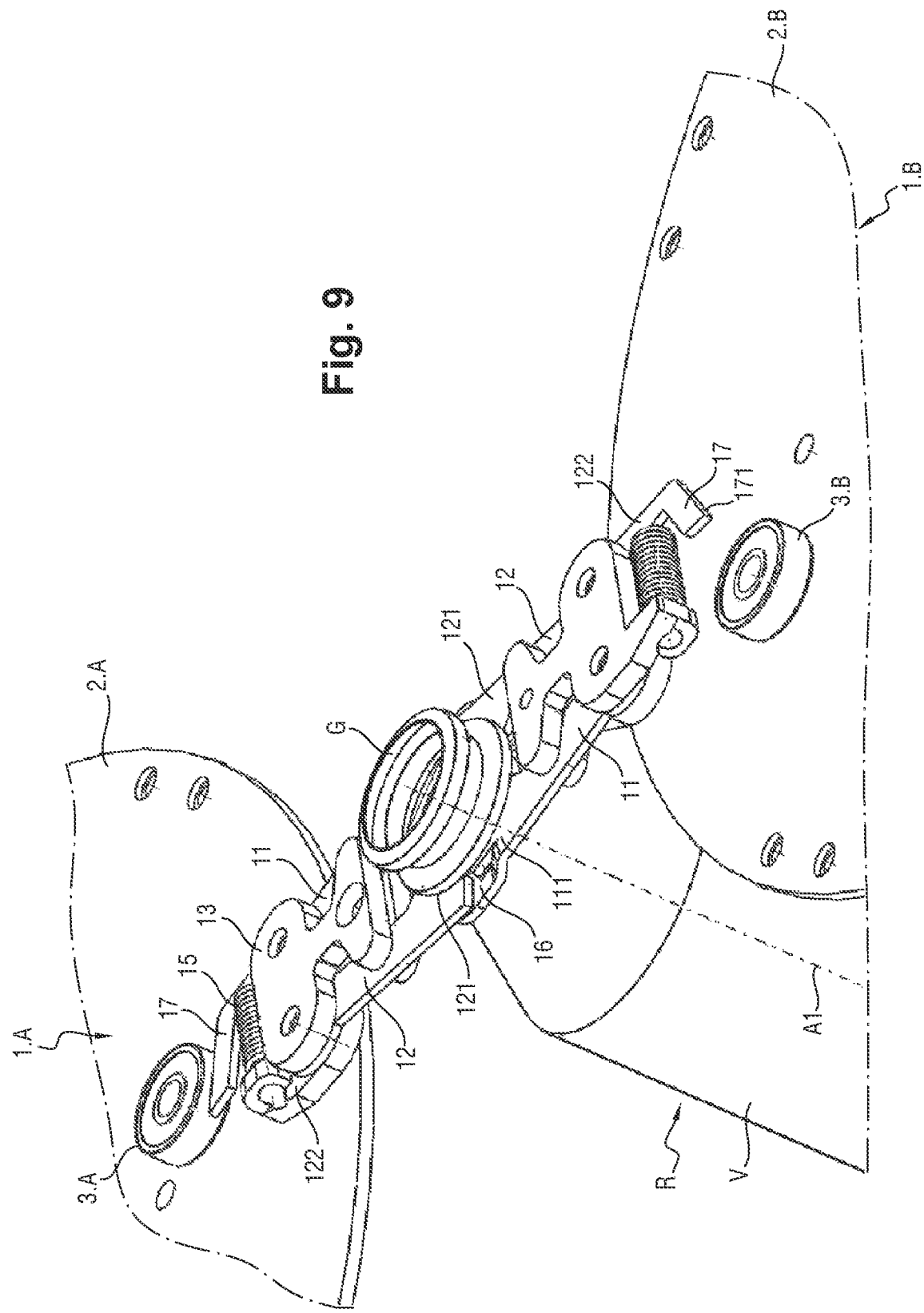
FIG. 9 is an enlarged perspective view of FIG. 7, seen from another different angle.

When the surface 171 of the gripper clamp 10.B leaves the wheel 3.B, the gripper clamp 10.B closes on the neck B that is then held simultaneously by both gripper clamps 10.A and 10.B (FIGS. 7, 8, 9). Since the ends 111 and 121 of the jaws 11 and 12 of the gripper clamps 10.A and 10.B do not cross the transverse axis A3, they do not interfere with one another. Since the finger 16 of the gripper clamp 10.A is symmetrically opposite the finger 16 of the gripper clamp 10.B and since it does not extend beyond the longitudinal axis A2, the fingers do not interfere with each other. Since the fingers 16 of each of the gripper clamps 10.A and 10.B are offset from the plane P1 in which the ends 111 and 121 lie, they do not interfere with said ends of the other gripper clamp 10.B or 10.A. More precisely, the finger 16 of the gripper clamp 10.A extends below the plane P1 and is spaced apart therefrom sufficiently to be able to pass under the end 121 of the jaw 12 of the gripper clamp 10.B, and symmetrically the finger 16 of the gripper clamp 10.B extends below the plane P1 and is spaced apart therefrom sufficiently to be able to pass under the end 121 of the jaw 12 of the gripper clamp 10.A.

Figure 10:
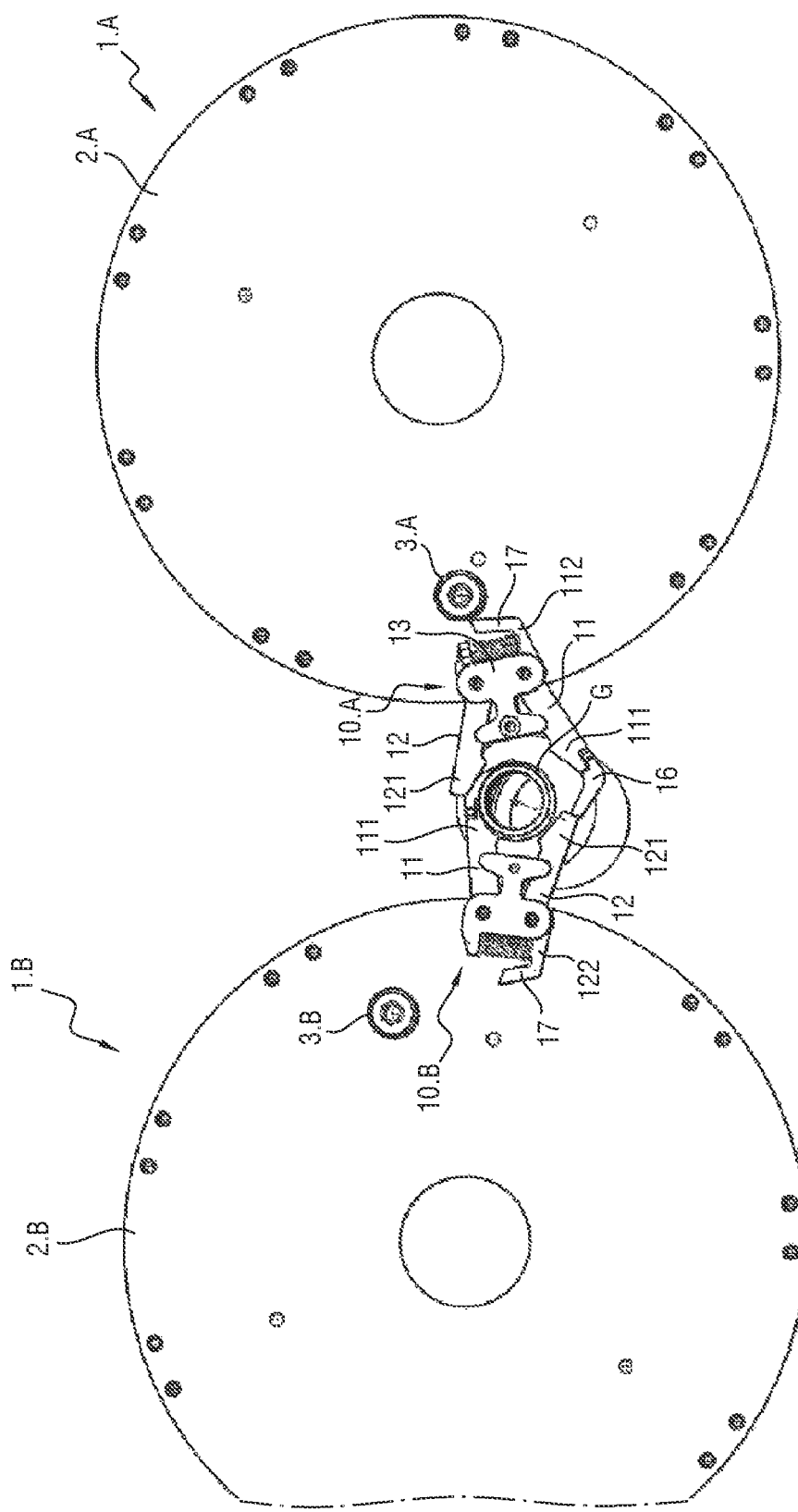
FIG. 10 is a view analogous to FIG. 5, after transfer of the container, which is shown taken by the second rotary structure.
Figure 11:
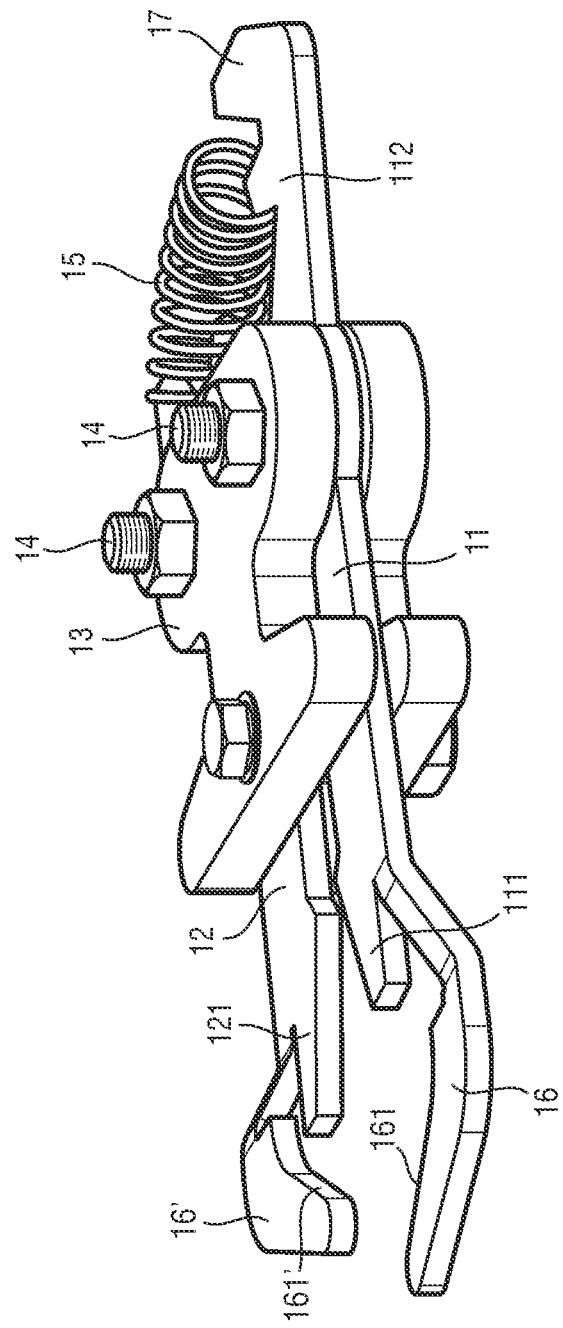
FIG. 11 is a perspective view of the clamp in a variant embodiment of the invention.
Figure 12:
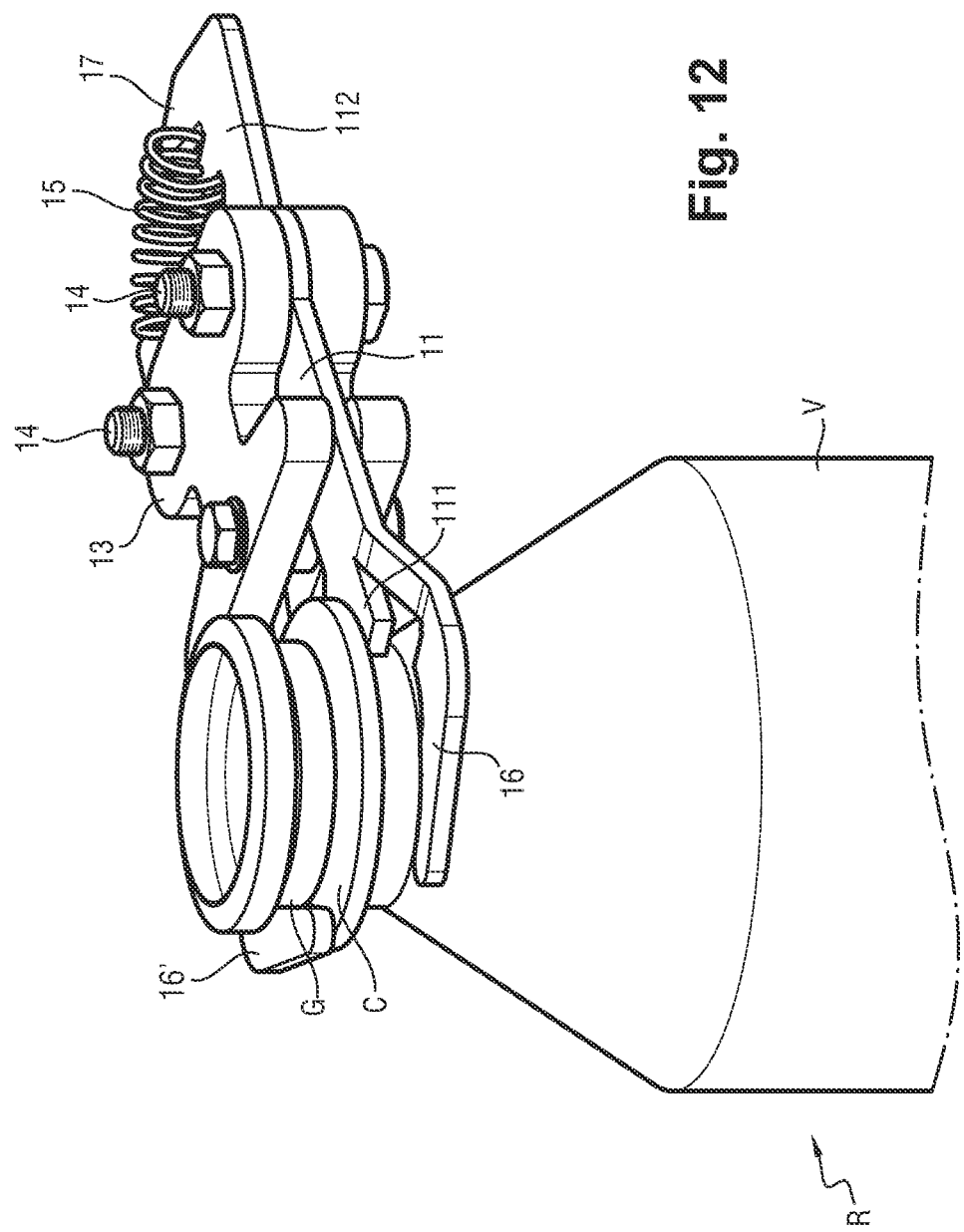
FIG. 12 is a view analogous to FIG. 1, showing this clamp while gripping a container.
Figure 13:
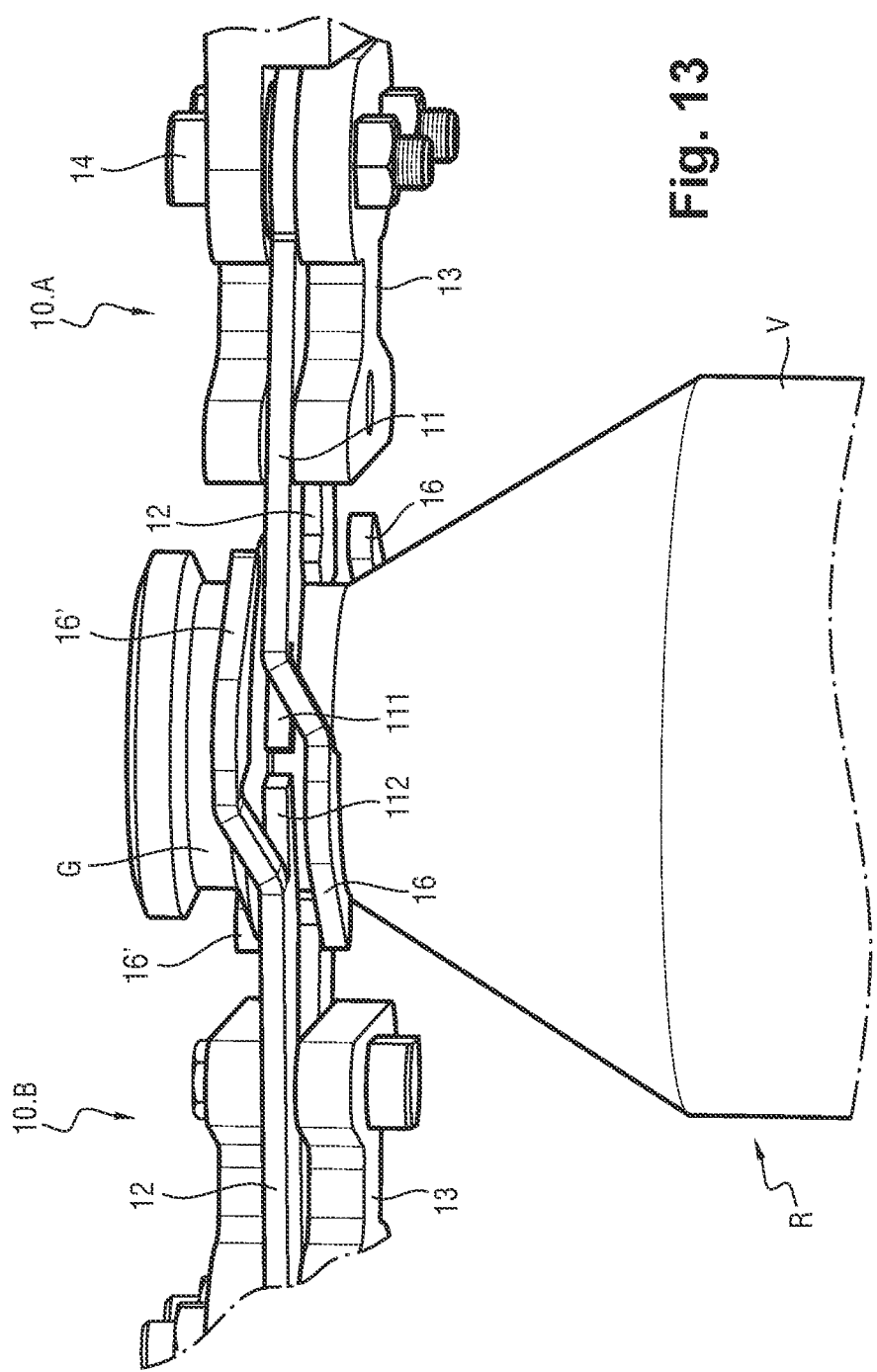
FIG. 13 is a diagrammatic perspective view of a processing installation of the invention, while transferring a container from a first rotary structure to a second rotary structure.
Figure 14:
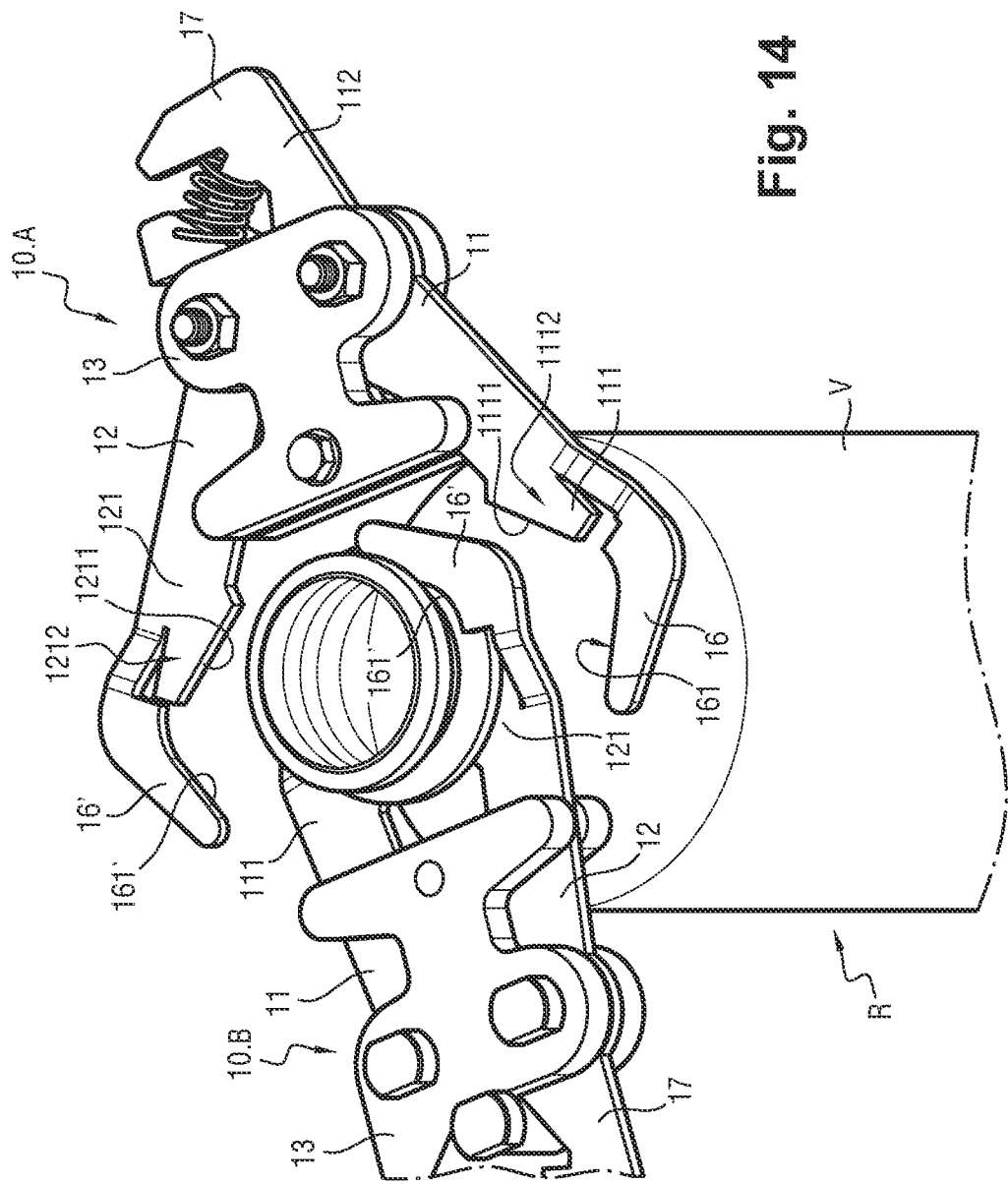
FIG. 14 is a fragmentary perspective view of this installation at the end of transferring the container.

As the rotary structures 2.A and 2.B continue to turn, the surface 171 bears against the wheel 3.A, thereby causing it to open so that the container leaves the gripper clamp 10.A and is supported only by the gripper clamp 10.B (FIG. 10).

In a variant, as shown in FIGS. 11 to 14, the first end 121 of the second jaw 12 is extended by a second finger 16' that is offset from the plane P1 and that has a bend so as to present a vertical surface 161' that bears against the neck G beyond the transverse axis A3, i.e. on a rear portion of the neck G that is opposite from the front portion in contact with the bearing surfaces 1111 and 1121. The bearing surface 1211 and the bearing surface 161' together likewise define a V-shape in which the neck G is held by the bearing surface 1111. More precisely, the finger 16' of the gripper clamp 10.A extends above the plane P1 and is spaced apart therefrom sufficiently to be able to pass over the end 111 of the jaw 11 of the gripper clamp 10.B, and symmetrically the finger 16' of the gripper clamp 10.B extends above the plane P1 and is spaced apart therefrom sufficiently to be able to pass over the end 111 of the jaw 11 of the gripper clamp 10.A.

Figure 15:
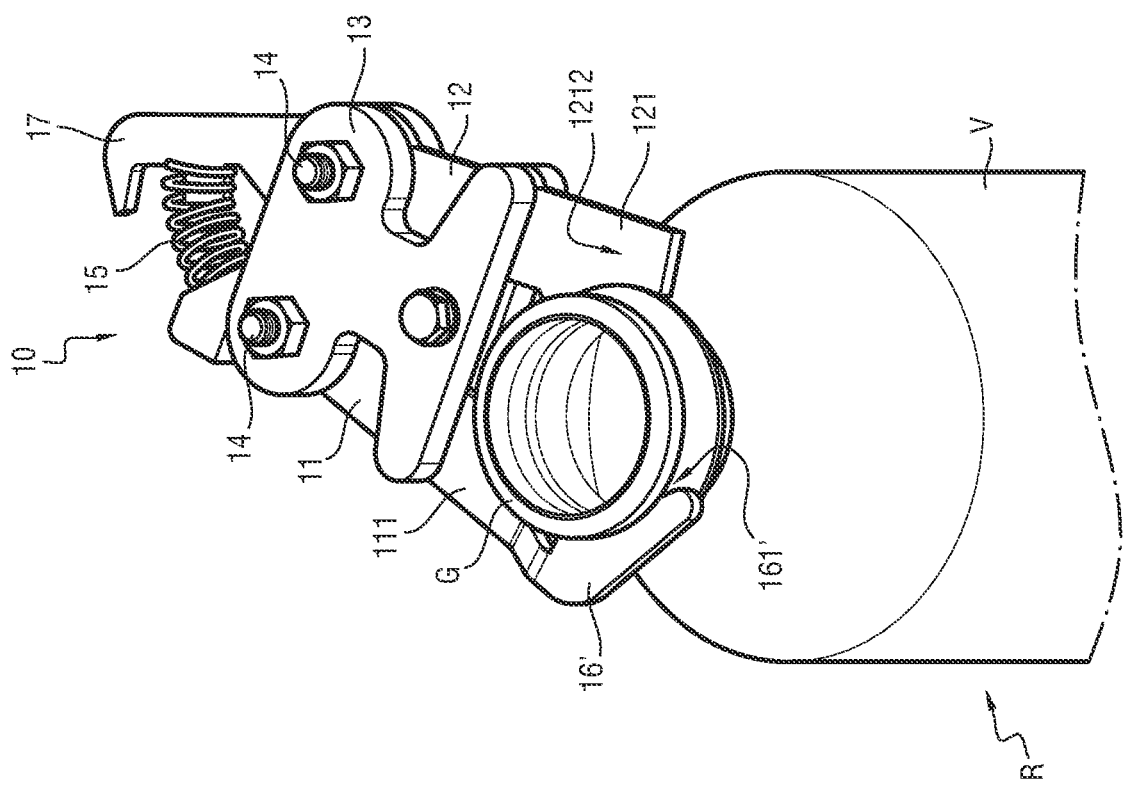
FIG. 15 is a view analogous to FIG. 1 showing a clamp in a preferred variant embodiment.

In the preferred variant of FIG. 15, only one of the jaws, namely the jaw 11, is extended by a finger, but unlike the embodiment of FIGS. 1 to 10, this finger extends above the plane P1, and not below it. Thus, The first end 111 of the first jaw 11 is extended by a finger 16' that is offset from the plane P1 and that has a bend so as to present a vertical surface 161' that bears against the neck G beyond the transverse axis A3, i.e. on a rear portion of the neck G that is opposite from the front portion in contact with the bearing surfaces 1111 and 1121. The bearing surface 1111 and the bearing surface 161' together likewise define a V-shape in which the neck G is held by the bearing surface 1211.

Preferably, when the neck G of the container R is provided with a collar C, the jaws 11 and 12 are arranged in such a manner that the collar C rests on the top surfaces 1112 and 1212 of the ends 111 and 112 of the jaws and so that the finger 16' bears against the neck G above the collar C.

Naturally, the invention is not limited to the preferred embodiments shown, and it may be applied in variant embodiments that are apparent to the person skilled in the art without going beyond the ambit of the invention as defined by the claims.

In particular, the spring 15 may extend between the plate and one of the jaws, between the rotary structure and one of the jaws, or between the jaws.

The jaws may be connected to the plate by a common pivot pin, or each of them may be connected to the plate by a respective pivot pin.

The jaws may be held in the closed position by any suitable means, and for example by friction or by a resilient element of structure that is different from that of the compression spring 15.

The clamps may be opened by any suitable means: for example, one of the jaws may carry a wheel that is to cooperate with a cam path secured to the stand.

The invention can also be used for transporting containers that do not have collars and for transporting other articles.

The finger may comprise a single piece or a plurality of pieces. The finger may be integral with the jaw, or it may be attached to the jaw. It may be connected to the jaw by folding or by welding/soldering or by screw-fastening, or by other means.

The finger may bear against any rear part of the cylindrical portion.

The installation may comprise a rotary structure having clamps with fingers that extend below the plane P1 and a rotary structure having clamps with fingers that extends above the plane P1.

The installation may comprise a transport structure that moves in rotation and that is tangential to a transport structure that moves linearly.

The invention claimed is:

1. A device for transferring articles, each having a substantially cylindrical portion of transverse size lying in a range from a minimum size to a maximum size, the transfer device comprising a transport structure carrying cantilevered-out gripper clamps, each comprising first and second jaws extending on respective sides of a longitudinal axis of the clamp, which jaws are movable relative to each other to bear against the cylindrical portion of an article and keep a central axis of the cylindrical portion of said article intersecting said longitudinal axis of the clamp regardless of the transverse size, the device being characterized in that the jaws have ends extending in a common plane, the jaws being provided with facing bearing surfaces so that together the facing bearing surfaces form together a V-shape for centering the cylindrical portion and the jaws being of a length such that said ends extend set back from a transverse axis of the cylindrical portion that is perpendicular both to the longitudinal axis of the clamp and to a central axis of the cylindrical portion, and in that said end of the first jaw is extended by a first finger that extends offset from the plane and that has a bend so as to form a V-shape with said end of the first jaw and bear against the cylindrical portion beyond the transverse axis.

2. The device according to claim 1, wherein only one of the jaws is extended by a finger, namely the first jaw f.

3. The device according to claim 1, wherein the second jaw is extended by a second finger that extends offset from the plane and that has a bend to bear against the cylindrical portion beyond the transverse axis, the first finger and the second finger each extending on a respective side of the plane.

4. The device according to claim 1, wherein each jaw is mounted to pivot about a pivot pin carried by the transport structure, at least one of the jaws being associated with a drive member arranged to cause the jaws to move apart relative to each other.

5. The device according to claim 4, wherein the first jaw or the second jaw includes a lever having a cam surface for cooperating with a stationary wheel during movement of the transport structure so as to cause the clamp to open.

6. The device according to claim 4, wherein the jaws are associated with at least one resilient element for urging the jaws towards a position where they are close to each other.

7. The device according to claim 1, wherein the transport structure is a rotary structure and the longitudinal axis of the clamp extends in a radial direction of the rotary structure.

8. The device according to claim 1, wherein the cylindrical portion includes a projecting collar and the first ends of the jaws have respective top surfaces arranged to support said collar.

9. The device according to claim 8, wherein one of the jaws is provided with a finger extending just above the collar.

10. An installation for processing containers, the installation including a first transfer device and a second transfer device according to claim 1, the transport structures being positioned to share a point of tangency between them, and the clamps of the transport structures being arranged in such a manner that, at the point of tangency, the first jaw of each clamp of the first transfer device extends facing the second jaw of each clamp of the second transfer device.

* * * * *